US012615464B2

(12) United States Patent
Kirkpatrick

(10) Patent No.: US 12,615,464 B2
(45) Date of Patent: Apr. 28, 2026

(54) UNIVERSAL EARPIECE

(71) Applicant: Decibullz LLC, Fort Collins, CO (US)

(72) Inventor: Kyle J Kirkpatrick, Fort Collins, CO (US)

(73) Assignee: Decibullz LLC, Fort Collins, CO (US)

( * ) Notice: Subject to any disclaimer, the term of this patent is extended or adjusted under 35 U.S.C. 154(b) by 56 days.

(21) Appl. No.: 18/230,484

(22) Filed: Aug. 4, 2023

(65) Prior Publication Data

US 2023/0379612 A1 Nov. 23, 2023

Related U.S. Application Data

(63) Continuation of application No. 29/836,965, filed on Apr. 29, 2022, now Pat. No. Des. 1,031,698.

(51) Int. Cl.
*H04R 1/10* (2006.01)

(52) U.S. Cl.
CPC ........... *H04R 1/1016* (2013.01); *H04R 1/105* (2013.01)

(58) Field of Classification Search
CPC ..... H04R 1/1016; H04R 1/105; H04R 1/1066
See application file for complete search history.

(56) References Cited

U.S. PATENT DOCUMENTS

| | | | | |
|---|---|---|---|---|
| 1,668,890 | A | 5/1928 | Curran et al. | |
| 8,249,287 | B2 * | 8/2012 | Silvestri ................. | H04R 1/105 381/370 |
| 8,666,102 | B2 | 3/2014 | Bruckhoff et al. | |
| 9,451,353 | B2 | 9/2016 | Kirkpatrick | |
| 10,009,680 | B2 | 6/2018 | Briggs et al. | |
| 10,129,669 | B2 | 11/2018 | Harris | |
| 10,149,038 | B2 | 12/2018 | Kirkpatrick | |
| 10,154,331 | B2 | 12/2018 | Houle | |
| 10,805,705 | B2 | 10/2020 | Rugolo et al. | |
| 2006/0067556 | A1 | 3/2006 | Bailey et al. | |
| 2012/0057739 | A1 * | 3/2012 | Smith .................... | H04R 1/105 381/379 |
| 2020/0016006 | A1 | 1/2020 | Van Den Hout et al. | |
| 2022/0201378 | A1 | 6/2022 | Monahan et al. | |

OTHER PUBLICATIONS

WO 2018/165716 A1 (Year: 2018) Rees, Sven Stuart.*

* cited by examiner

*Primary Examiner* — Brian Ensey
(74) *Attorney, Agent, or Firm* — Craig R. Miles; CR MILES P.C.

(57) ABSTRACT

A universal earpiece, and methods of making and using such an earpiece, whereby the earpiece includes a retaining body, and a projection element outwardly extending from the retaining body. When a wearer wears the earpiece, the retaining body is configured to dispose within the concha of an ear of a wearer, and the projection element is configured for projecting into the ear canal opening of the wearer. Upon rotation of the earpiece, the retaining body fixedly engages with the concha to retain the projection element within the ear canal opening.

20 Claims, 16 Drawing Sheets

UNIVERSAL EARPIECE

I. SUMMARY OF THE INVENTION

A broad object of the invention can be to provide a universal earpiece, and methods of making and using such an earpiece, whereby the earpiece includes a retaining body, and a projection element outwardly extending from the retaining body. When a wearer wears the earpiece, the retaining body is configured to dispose within the concha of an ear of a wearer, and the projection element is configured for projecting into the ear canal opening of the wearer. Upon rotation of the earpiece, the retaining body fixedly engages with the concha to retain the projection element within the ear canal opening.

Naturally, further objects of the invention are disclosed throughout other areas of the specification, drawings, and claims.

II. A BRIEF DESCRIPTION OF THE DRAWINGS

III. DETAILED DESCRIPTION OF THE PREFERRED EMBODIMENTS

Figure 1C:
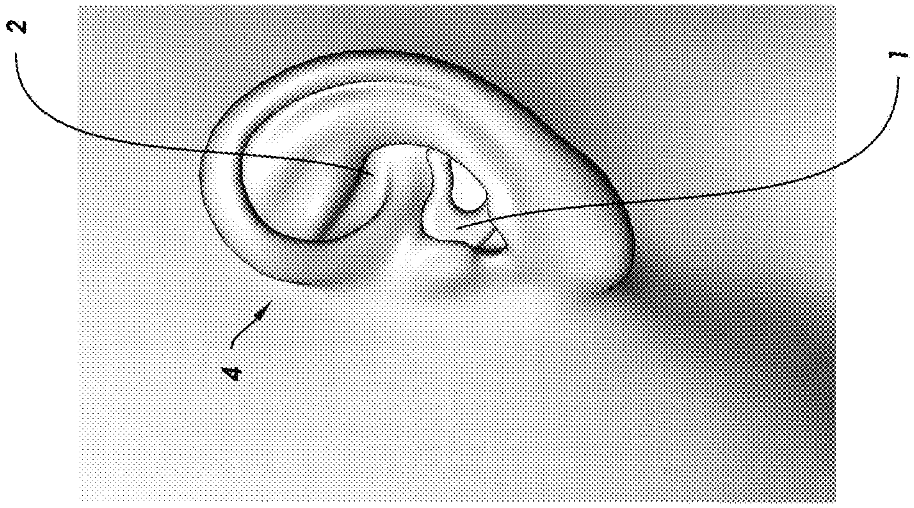
FIG. 1C is an illustration of a third rotational position of a particular embodiment of the universal earpiece which may provide an optimal fit within the concha.
Figure 1B:
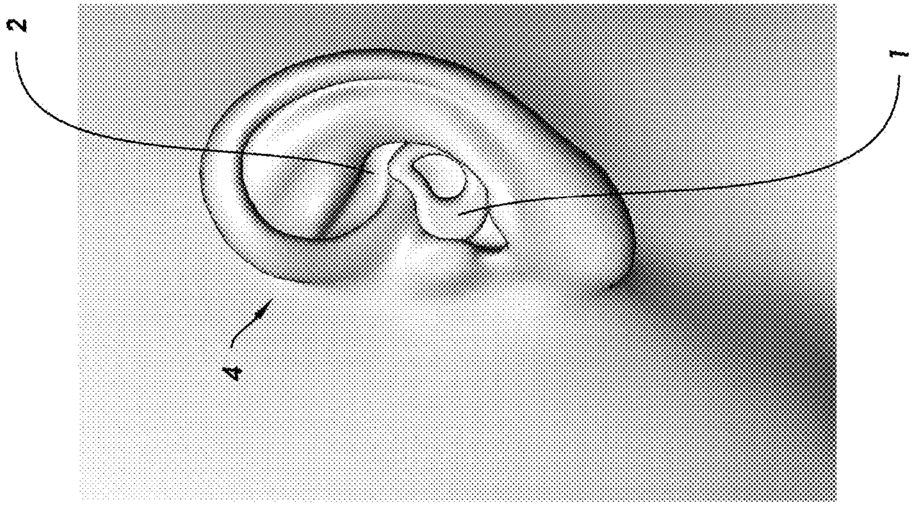
FIG. 1B is an illustration of a second rotational position of a particular embodiment of the universal earpiece which may provide an optimal fit within the concha.
Figure 1A:
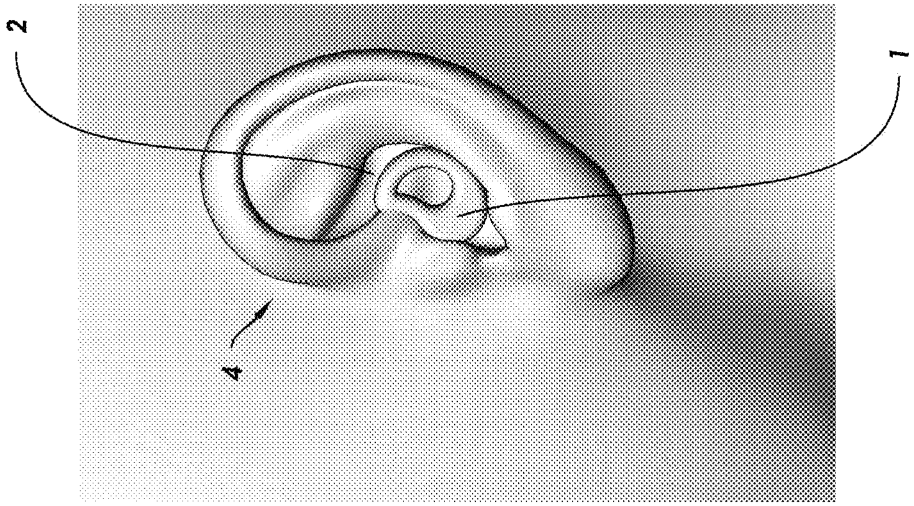
FIG. 1A is an illustration of a first rotational position of a particular embodiment of the universal earpiece which may provide an optimal fit within the concha.

Now referring primarily to FIGS. 1A through 1C and 10A through 10C, which illustrate methods of using a particular embodiment of the inventive universal earpiece (1) which can be disposed within the concha (2) and the external ear canal opening (3) of an ear (4) of a human wearer, and can further be rotated to fixedly engage the earpiece (1) with a variety of ears (4) having different sizes and/or shapes, thereby providing an earpiece (1) with a substantially universal fit.

Figure 2:
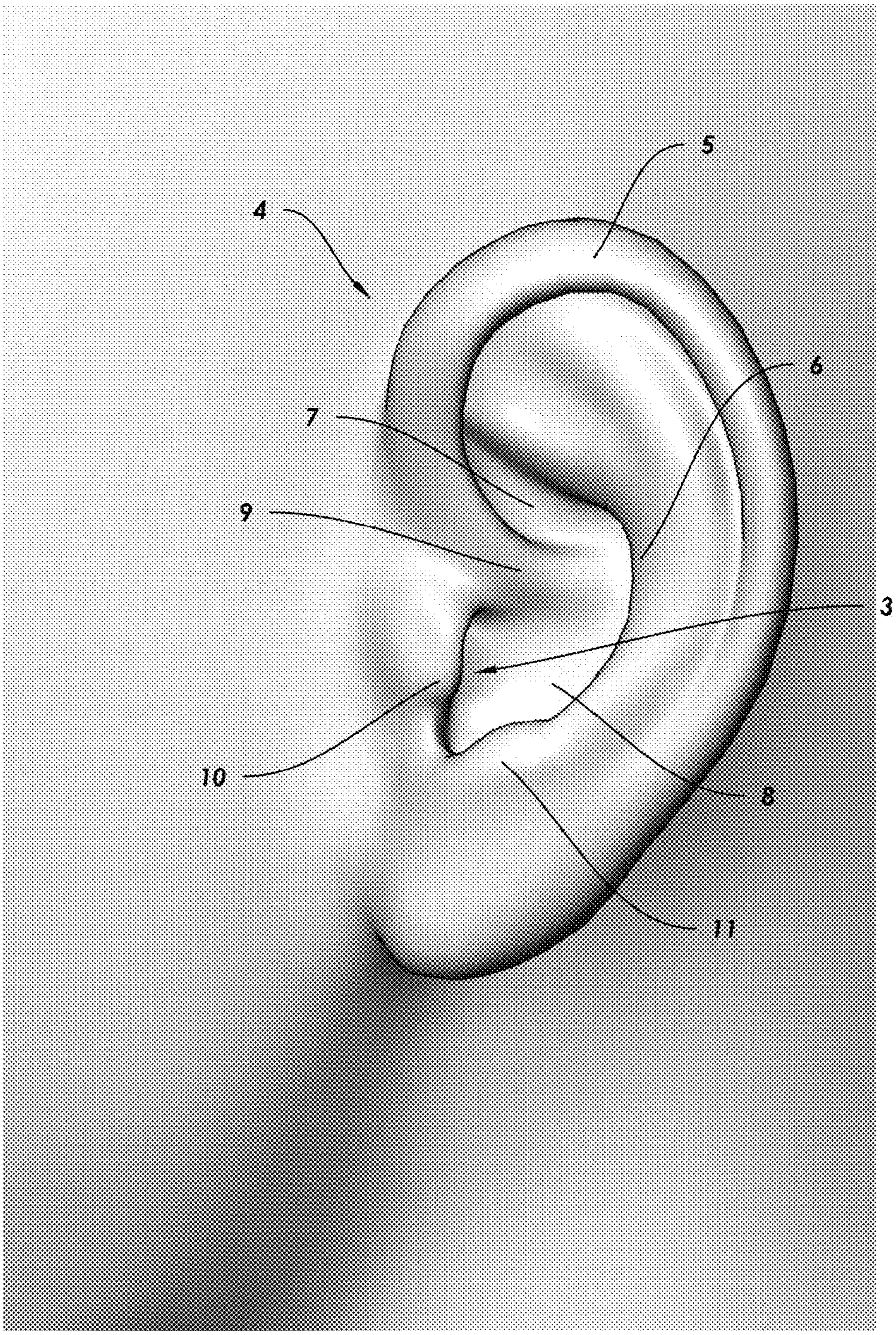
FIG. 2 is an illustration of an exterior view of an exemplary human left ear.
Figure 3A:
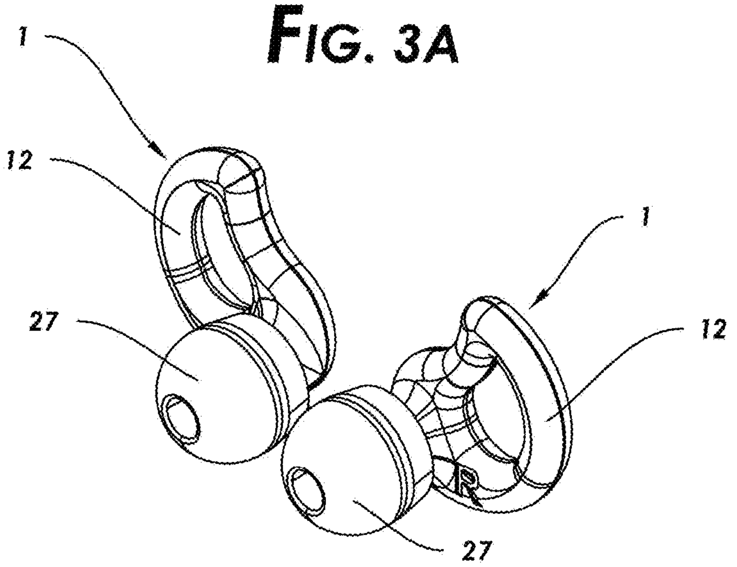
FIG. 3A is a perspective view of a particular embodiment of a pair of inventive universal earpieces.
Figure 3B:
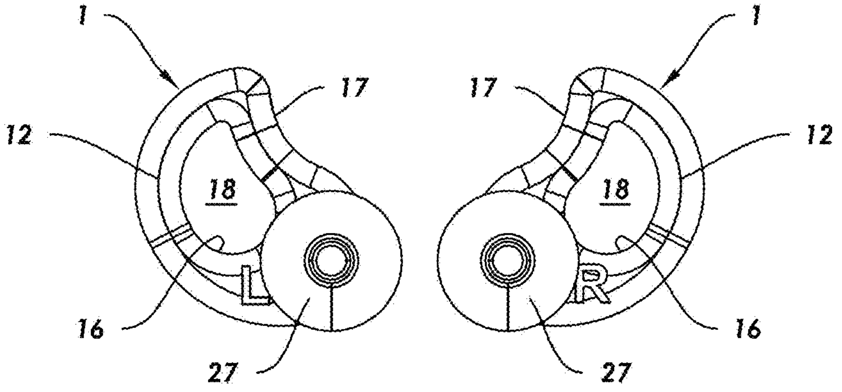
FIG. 3B is a front view of the particular embodiment of the earpieces shown in FIG. 3A.
Figure 3C:
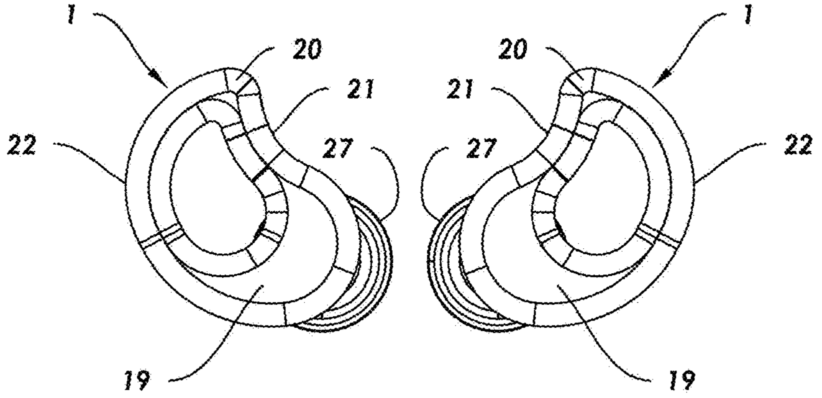
FIG. 3C is a rear view of the particular embodiment of the earpieces shown in FIG. 3A.
Figure 3D:
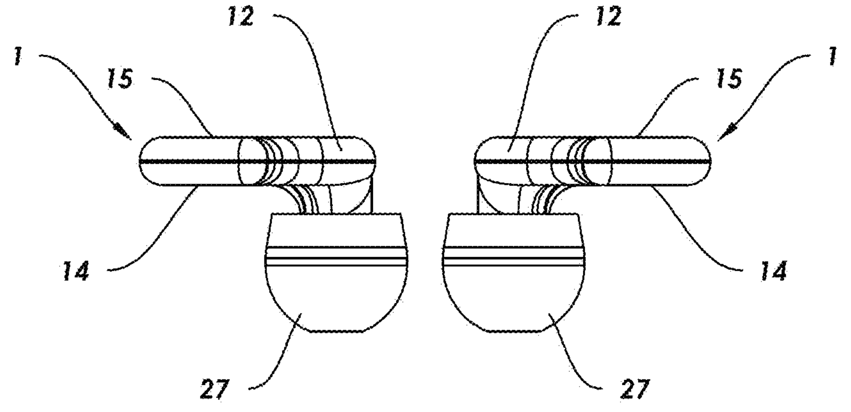
FIG. 3D is a top view of the particular embodiment of the earpieces shown in FIG. 3A.
Figure 3E:
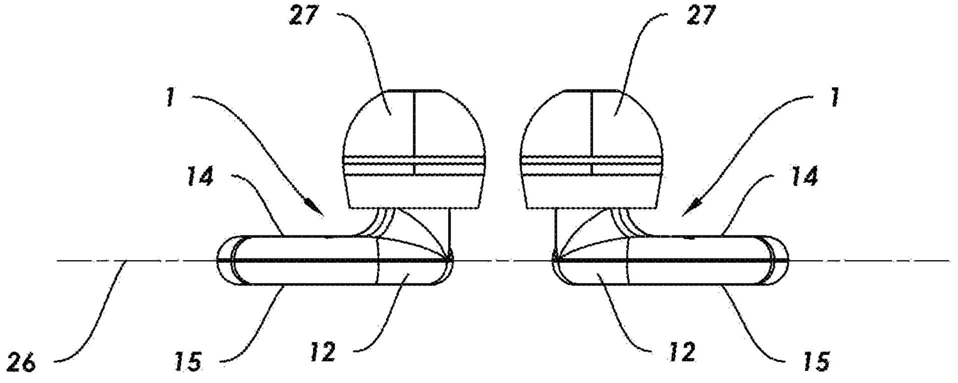
FIG. 3E is a bottom view of the particular embodiment of the earpieces shown in FIG. 3A.
Figure 3F:
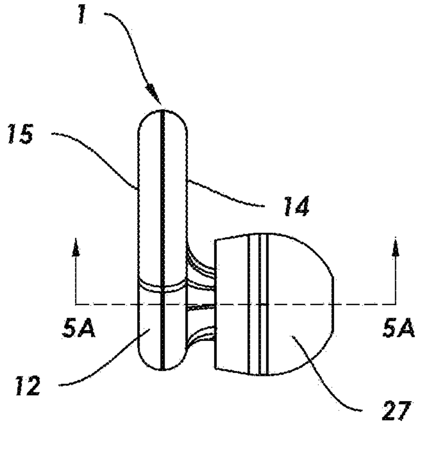
FIG. 3F is a left view of the particular embodiment of the earpieces shown in FIG. 3A.
Figure 3G:
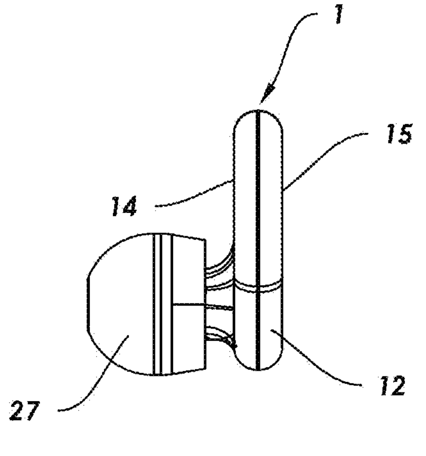
FIG. 3G is a right view of the particular embodiment of the earpieces shown in FIG. 3A.
Figure 4A:
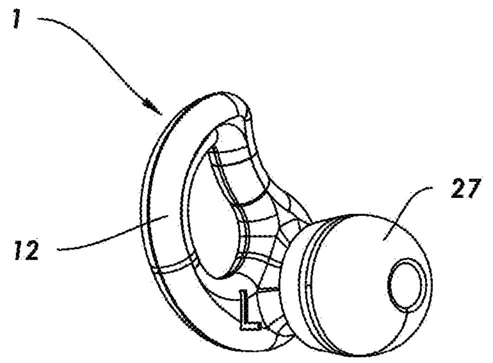
FIG. 4A is a perspective view of a particular embodiment of a left inventive universal earpiece.
Figure 4B:
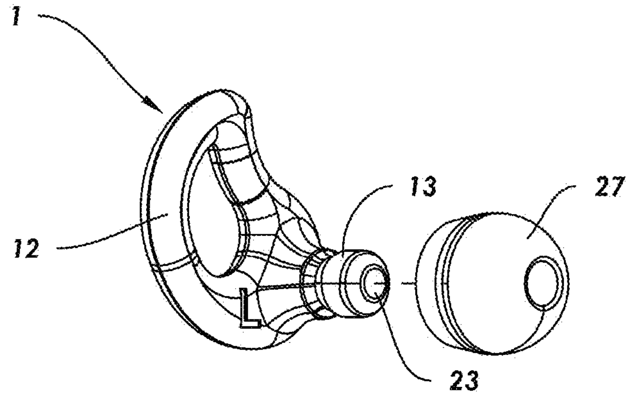
FIG. 4B is an exploded view of the earpiece shown in FIG. 4A.
Figure 4C:
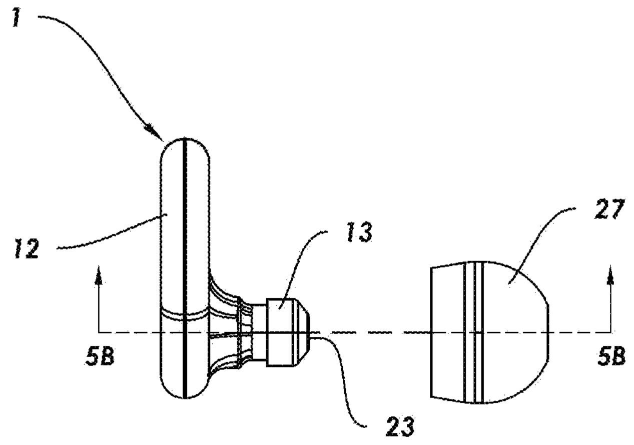
FIG. 4C is an exploded left view of the earpiece shown in FIG. 4A.
Figure 4D:
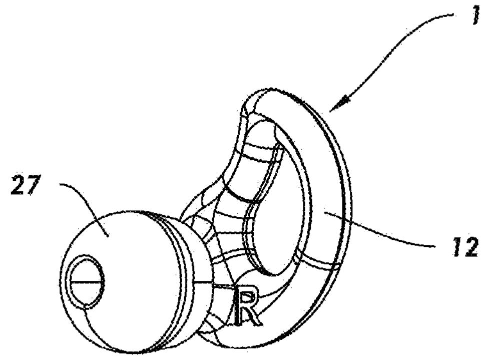
FIG. 4D is a perspective view of a particular embodiment of a right inventive universal earpiece.
Figure 4E:
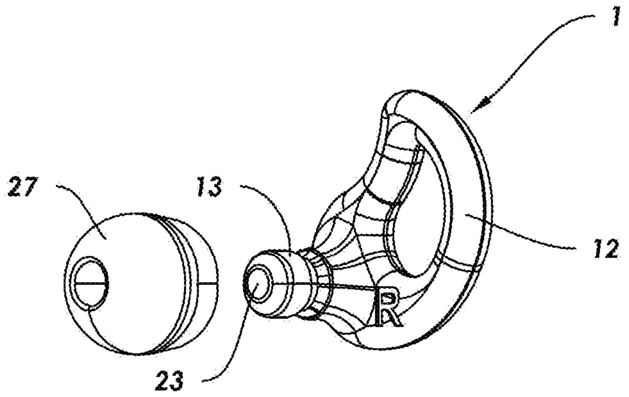
FIG. 4E is an exploded view of the earpiece shown in FIG. 4D.
Figure 4F:
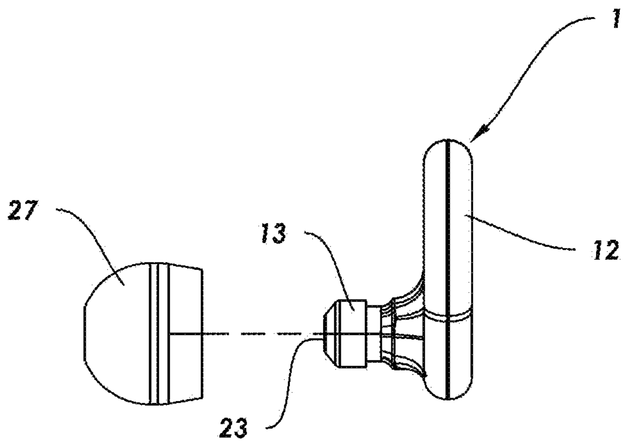
FIG. 4F is an exploded right view of the earpiece shown in FIG. 4D.
Figure 11:
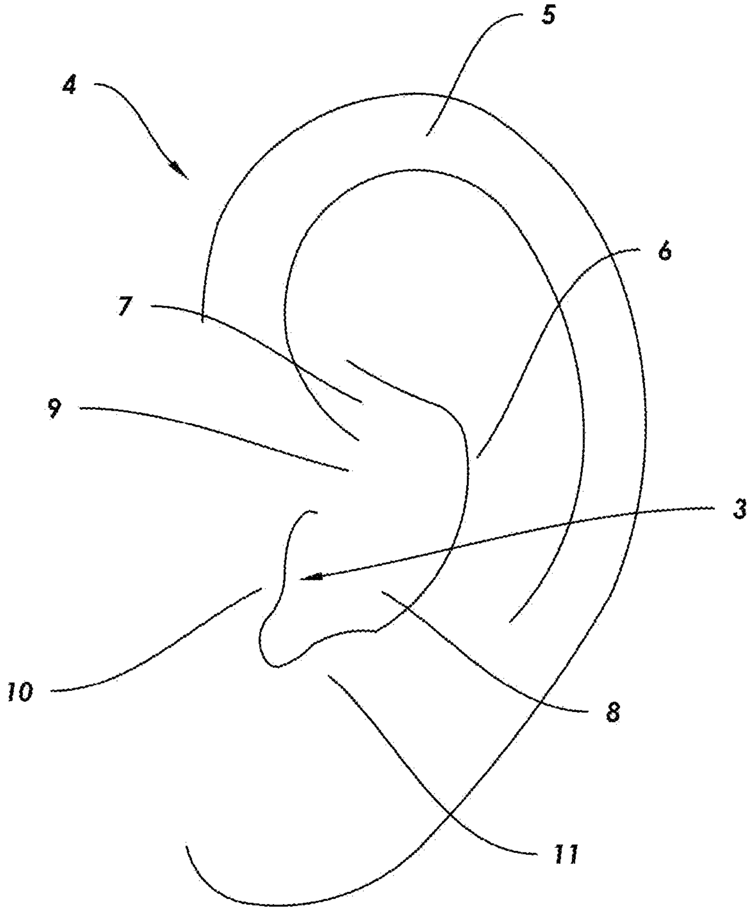
FIG. 11 is an illustration of an exterior view of an exemplary human left ear.

Now referring primarily to FIGS. 2 and 11, for illustration purposes and to aid in the understanding of the placement of the present universal earpiece (1), an exterior view of an exemplary human left ear (4) is shown. The external ear (4) is an irregularly concave cartilaginous member including a number of eminences and depressions which give each ear (4) a distinct size and/or shape. The auricle, also known as the pinna, is the visible portion of the ear (4). The helix (5) is the curved outer rim of the ear (4). Below the helix (5) is the antihelix (6), a prominence which describes a curve around the concha (2), a relatively deep cavity containing the ear canal opening (3) which provides entry to the ear canal (or auditory canal). The concha (2) is divided into two parts, the cymba concha (7) and the cavum concha (8), by the crus helix (9) which curves around the outside of the ear (4), and extends inwards at about the vertical midpoint of the ear (4). The cymba concha (7) lies above the crus helix (9) and below the antihelix (6). The cavum concha (8) lies below the crus helix (9) and surrounds the ear canal opening (3). In front of the cavum concha (8) and projecting backwards from the front of the ear (4) is the tragus (10), a small semicircular prominence. Opposite the tragus (10) and separated from it by the deep curvature of the intertragic notch is the antitragus (11). Of note, different ears (4) have different sizes and shapes. In this regard, the precise structure of the human ear (4) varies from individual to individual. For example, some ears (4) may have additional features that are not shown in FIGS. 2 and 11, and some ears may lack some of the features that are shown in FIGS. 2 and 11. Likewise, some features of different ears (4) may be more or less prominent than those shown in FIGS. 2 and 11.

Now generally referring to FIGS. 3A through 8B, the present universal earpiece (1) (which may be provided as a pair of earpieces (1), whereby one earpiece (1) can be a mirror image of the other to fit in the right and left ears (4) of a wearer, both earpieces (1) having the same structure and function) can include a retaining body (12) and a projection element (13) outwardly extending therefrom, whereby the retaining body (12) can function to retain the projection element (13) within the ear canal opening (3) and/or ear canal. The retaining body (12) can have a retaining body inner surface (14) opposite a retaining body outer surface (15), whereby each surface (14)(15) extends between retaining body internal and external edges (16)(17).

The retaining body (12) can be configured for positioning within the external ear (4) to engage therewith and provide mechanical stability for holding the earpiece (1) in place. As to particular embodiments, the retaining body (12) can be positioned within the area of the external ear (4) anatomically defined by one or more of the concha (2) (also referred to as the concha bowl), antihelix (6), antitragus (11), or tragus (10), whereby the retaining body inner surface (14) can be of sufficient area to preclude ingress of the retaining body (12) into the ear canal opening (3). As to particular embodiments, the retaining body (12) can be configured to be positioned within the concha (2) concurrent with disposition of the projection element (13) within the ear canal opening (3).

Again referring primarily to FIGS. 3A through 8B, the retaining body (12) can be configured as an annular or ring-shaped member which defines an aperture element (18) communicating between the retaining body inner and outer surfaces (14)(15). As to particular embodiments, the retaining body (12) can be configured as a continuous (or closed) annular member, meaning an unbroken or uninterrupted annular member.

The retaining body inner surface (14) can dispose toward the ear canal opening (3) when the earpiece (1) is worn by a wearer; thus, the retaining body inner surface (14) may be in contact with a portion of the concha (2). Correspondingly, the opposing retaining body outer surface (15) can dispose away from the ear canal opening (3) when the earpiece (1) is worn by a wearer; hence, the retaining body outer surface (15) may be visible when the earpiece (1) is worn. As to particular embodiments, the retaining body inner surface (14) can be substantially planar (or generally flat). As to particular embodiments, the retaining body outer surface (15) can be substantially planar (or generally flat). As to particular embodiments, both the retaining body inner and outer surfaces (14)(15) can be substantially planar (or generally flat). As to particular embodiments, the retaining body inner and outer surfaces (14)(15) can dispose in substantially parallel relation.

Again referring primarily to FIGS. 3A through 8B, the retaining body (12) can include a first portion which disposes proximate the ear canal opening (3) when the earpiece (1) is worn by a wearer, henceforth termed the "proximal portion" (19), generally opposite a second portion which disposes distal from the ear canal opening (3) when the earpiece (1) is worn by a wearer, henceforth termed the "distal portion" (20). The proximal and distal portions (19)(20) can be connected by a pair of arcuate portions, namely an inner arcuate portion (21) and an opposing outer arcuate portion (22), whereby the outer arcuate portion (22) can dispose proximate the antihelix (6) when the earpiece (1) is worn by a wearer. Correspondingly, the outer arcuate portion (22) can be curved to generally follow the curve of the antihelix (6) and/or the rear of the cavum concha (8). As the retaining body (12) can be configured as a continuous annular member, the portions (19)(20)(21)(22) can all be interconnected or connected to one another to form said continuous annular member. In particular, the proximal portion (19) can be connected to the outer arcuate portion (22) which can be connected to the distal portion (20) which can be connected to the inner arcuate portion (21) which can be connected to the proximal portion (19) to form the continuous annular member.

As stated above, the proximal portion (19) of the retaining body (12) can dispose proximate the ear canal opening (3) when the earpiece (1) is worn by a wearer. The proximal portion (19) can be convexly arcuate, and can have one or more radii of curvature, which as an illustrative example, can be in a range of between about 4.3 mm and about 8.7 mm. As but one illustrative example, the radius of curvature or the average radius of curvature of the proximal portion (19) can be about 6.5 mm.

As stated above, the distal portion (20) of the retaining body (12) can dispose distal from the ear canal opening (3) when the earpiece (1) is worn by a wearer, whereby the distal portion (20) can be generally opposite the proximal portion (19). The distal portion (20) can be convexly arcuate, and can have one or more radii of curvature, which as an illustrative example, can be in a range of between about 1.3 mm and about 3.3 mm. As but one illustrative example, the radius of curvature or the average radius of curvature of the distal portion (20) can be about 2.3 mm. As to particular embodiments, the distal portion (20) can have the smallest radius of curvature or average radius of curvature of all four portions (19)(20)(21)(22).

As to particular embodiments, the proximal portion (19) can have a radius of curvature or average radius of curvature which can be greater than the radius of curvature or average radius of curvature of the distal portion (20). As but one illustrative example, as to particular embodiments, the proximal portion (19) can have a radius of curvature or average radius of curvature which can be at least about 2× greater than the radius of curvature or average radius of curvature of the distal portion (20). As but another illustrative example, as to particular embodiments, the proximal portion (19) can have a radius of curvature or average radius of curvature which can be at least about 3× greater than the radius of curvature or average radius of curvature of the distal portion (20).

As stated above, the outer arcuate portion (22) can be curved to generally follow the curve of the antihelix (6) and/or the rear of the cavum concha (8). Following, the outer arcuate portion (22) can be convexly arcuate, and can have one or more radii of curvature, which as an illustrative example, can be in a range of between about 6.3 mm and about 15.1 mm. As but one illustrative example, the radius of curvature or the average radius of curvature of the outer arcuate portion (22) can be about 10.4 mm. As to particular embodiments, the outer arcuate portion (22) can have the largest radius of curvature or average radius of curvature of all four portions (19)(20)(21)(22).

The inner arcuate portion (21) can be concavely arcuate, and can have one or more radii of curvature which, as to particular embodiments, can be lesser than the radius of curvature or average radius of curvature of the outer arcuate portion (22). As an illustrative example, the inner arcuate portion (21) can have one or more radii of curvature in a range of between about 3.8 mm and about 10.5 mm. As but one illustrative example, the radius of curvature or the average radius of curvature of the inner arcuate portion (21) can be about 6.4 mm.

As to particular embodiments, the radius of curvature or the average radius of curvature of the inner arcuate portion (21) can be similar to the radius of curvature or average radius of curvature of the proximal portion (19).

As stated above, the retaining body (12) can be configured as a continuous annular member; correspondingly, the retaining body internal edge (16) can define an aperture element (18) communicating between the retaining body inner and outer surfaces (14)(15). As to particular embodiments, the retaining body (12) configured as a continuous annular member can define only one aperture element (18) communicating between the retaining body inner and outer surfaces (14)(15), whereby this configuration may provide greater elastic deformability of the retaining body (12) for improved fixed engagement with the concha (2).

Now referring primarily to FIGS. 1A through 1C and 10A through 10C, following disposition within the concha (2), the earpiece (1) can be rotated about an axis which passes through the earpiece (1) and aligns with the ear canal opening (3) to optimally engage the retaining body (12) with one or more of the antihelix (6), antitragus (11), or tragus (10) to provide a convenient, reliable, slip-proof, shift-proof, and/or loss-proof fit for corresponding stable and/or comfortable retention of the earpiece (1) within the ear (4), regardless of the size and/or shape of the ear (4). In this way, the present earpiece (1) can a "universal" or "one-size-fits-all" earpiece (1).

For rotation of the earpiece (1), the outer arcuate portion (22) can be slidably engageable with the wall of the concha (2) to facilitate retention of the retaining body (12) therein via contact or engagement of one or more of the antihelix (6), antitragus (11), or tragus (10) with the retaining body (12) such that the retaining body (12) can be held in place by a friction and/or interference fit which provides anchoring force(s). As to particular embodiments, retention of the retaining body (12) within the concha (2) can be facilitated by elastic deformation of the retaining body (12) to achieve optimal contact or engagement with one or more of the antihelix (6), antitragus (11), or tragus (10). As to particular embodiments, when retained within the concha (2), the retaining body (12) can be in contact with and/or disposed behind, beneath, or underneath one or more of the antihelix (6), antitragus (11), or tragus (10) to effectively wedge the retaining body (12) and correspondingly the earpiece (1) within the concha (2) which, in turn, retains the projection element (13) within the ear canal opening (3).

As to particular embodiments, the outer arcuate portion (22) of the earpiece (1) can contact the wall of the cavum concha (8) and be slidably engageable therewith. As to particular embodiments, the outer arcuate portion (22) of the earpiece (1) can contact the wall of the cavum concha (8) and be slidably engageable therewith, and not contact the wall of the cymba concha (7); said another way, regarding the wall of the concha (2), the outer arcuate portion (22) of the earpiece (1) can contact only the wall of the cavum concha (8) and be slidably engageable therewith.

The retaining body (12) can be fabricated, formed, or molded from a wide variety of elastic or rigid thermoplastics having a prerequisite hardness (or softness) including, but not necessarily limited to, silicone, acrylic, nylon, acrylonitrile butadiene styrene, polylactic acid, polybenzimidzole, polycarbonate, polyether sulfone, polyethylene, urethane, other like materials, or combinations thereof. As to particular embodiments, the retaining body (12) can comprise a somewhat elastically flexible and/or compressible material to "spring hold" the retaining body (12) in the wearer's ear (4). Put another way, the retaining body (12) may be flexed and/or compressed slightly when inserted into the concha (2), and it may remain therein via a friction and/or interference fit as the retaining body (12) characteristically tries to unflex and/or expand from the flexed and/or compressed state.

As to particular embodiments, the retaining body (12) can, but need not necessarily, include adhesion elements (not shown), such as patterned surface elements disposed on or in the retaining body inner surface (14) and/or retaining body outer surface (15), whereby the patterned surface elements can provide a uniform or irregular pattern, texture, and/or roughness sufficient to fix or reduce travel of the retaining body (12) within the concha (2). The patterned surface elements can be one piece with the retaining body (12) or can be applied to the retaining body (12) as a layer or individual elements.

As to particular embodiments, the retaining body (12) can, but need not necessarily, comprise a tackifier (not shown) incorporated into the retaining body (12) or applied to the retaining body inner surface (14) and/or retaining body outer surface (15) to increase the tack, or stickiness, of the retaining body (12). As illustrative examples, the tackifier can include or consist of one or more of rosin resins, hydrocarbon resins, terpene resins, or other like materials.

Now referring primarily to FIGS. 4B, 4C, 4E through 5B, 7B, 7C, and 7E through 8B, the earpiece (1) can further include a projection element (13) outwardly extending from the retaining body (12) to terminate in a projection element end (23), whereby the projection element (13) can project into the ear canal opening (3) to dispose the projection element end (23) within the ear canal when the earpiece (1) is worn by a wearer to occlude the ear canal opening (3) and block, whether partially or completely, external sound or noise. As discussed above, the retaining body (12) can function to retain the projection element (13) within the ear canal opening (3).

The projection element (13) can be configured as a substantially straight (or linear) solid or tubular elongate member having a length (24) and cross-section sufficient for disposition within the ear canal opening (3) and the portion of the ear canal adjacent the ear canal opening (3). As to particular embodiments, the length (24) of the projection element (13) can be in a range of between about 4 millimeters and about 8 millimeters. As but one illustrative example, the length (24) of the projection element (13) can be about 7.7 millimeters. As to particular embodiments, the projection element (13) can have a circular, oval, square, rectangular, or polygonal cross-sectional configuration, but need not be limited thereto.

The projection element (13) can outwardly extend from a location on the retaining body inner surface (14) proximate the proximal portion (19) which aligns the projection element (13) with the ear canal opening (3) for disposition therein concurrent with disposition of the retaining body (12) within the concha (2) when the earpiece is worn by a wearer. The projection element (13) can be disposed on, coupled to, directly coupled to, connected to, or directly connected to the retaining body inner surface (14) at a location which aligns the projection element (13) with the ear canal opening (3) for disposition therein concurrent with disposition of the retaining body (12) within the concha (2) when the earpiece is worn by a wearer. As to particular embodiments, the projection element (13) can be integrally formed with the retaining body inner surface (14) (such that the projection element (13) and the retaining body (12) can be formed as a one-piece construct, a monolithic construct, or a unified whole) at a location which aligns the projection element (13) with the ear canal opening (3) for disposition therein concurrent with disposition of the retaining body (12) within the concha (2) when the earpiece is worn by a wearer.

Figure 5A:
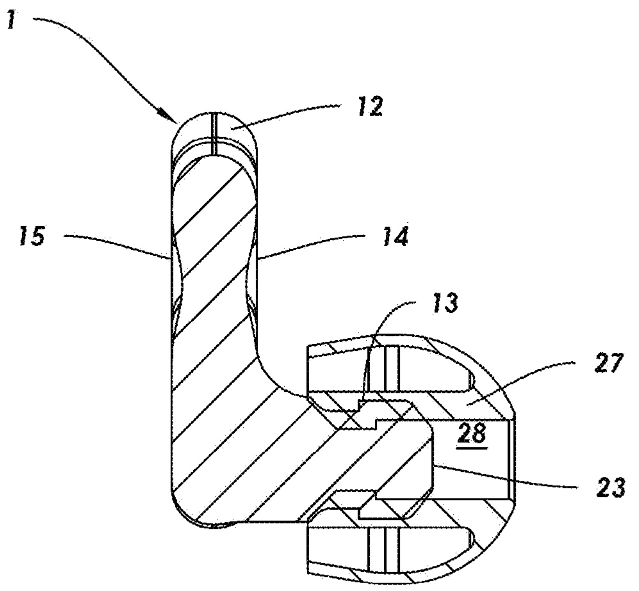
FIG. 5A is a cross-sectional view of the particular embodiment of the inventive universal earpiece shown in FIG. 3F.
Figure 5B:
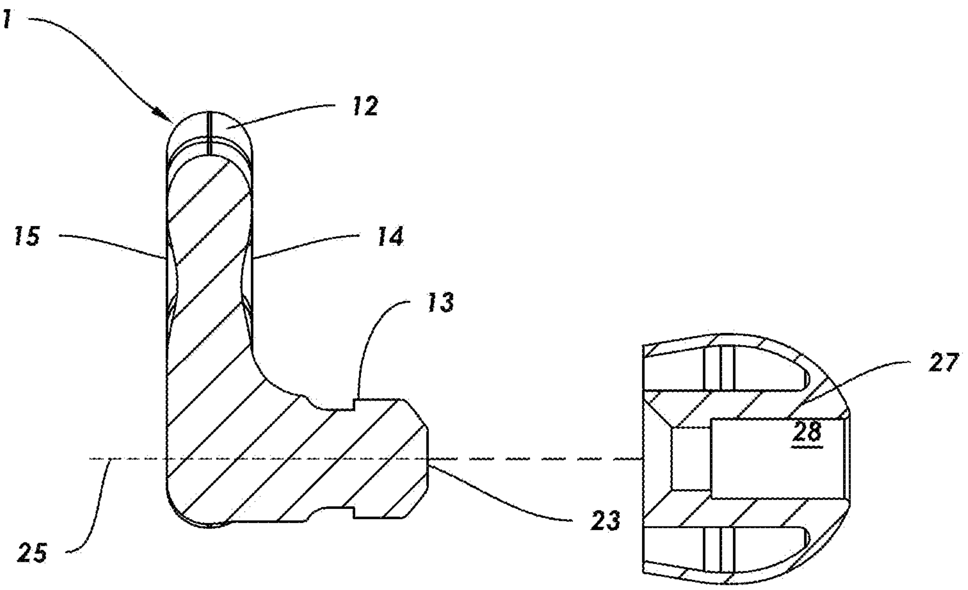
FIG. 5B is a cross-sectional view of the particular embodiment of the inventive universal earpiece shown in FIG. 4C.
Figure 6A:
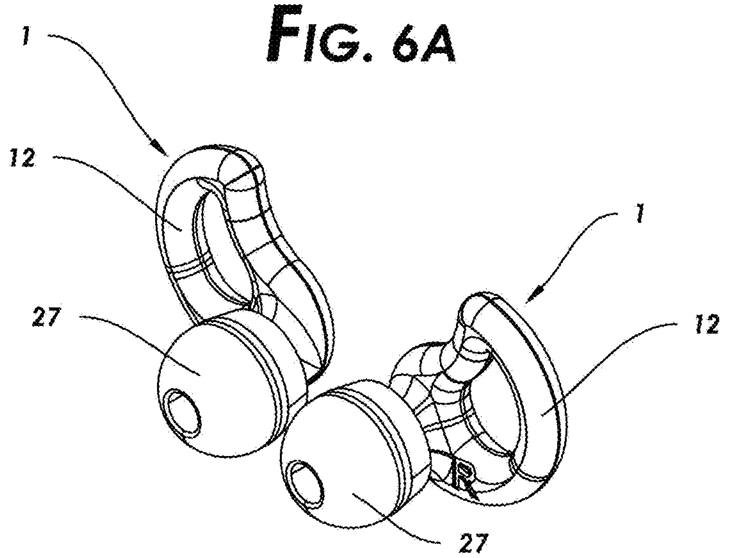
FIG. 6A is a perspective view of a particular embodiment of a pair of inventive universal earpieces.
Figure 6B:
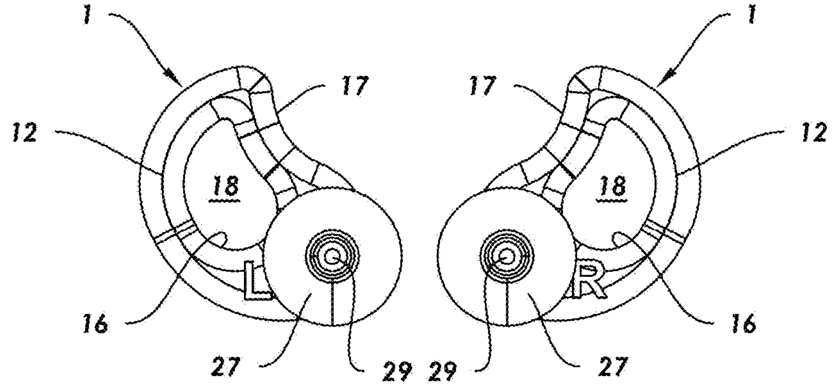
FIG. 6B is a front view of the particular embodiment of the earpieces shown in FIG. 6A.
Figure 6C:
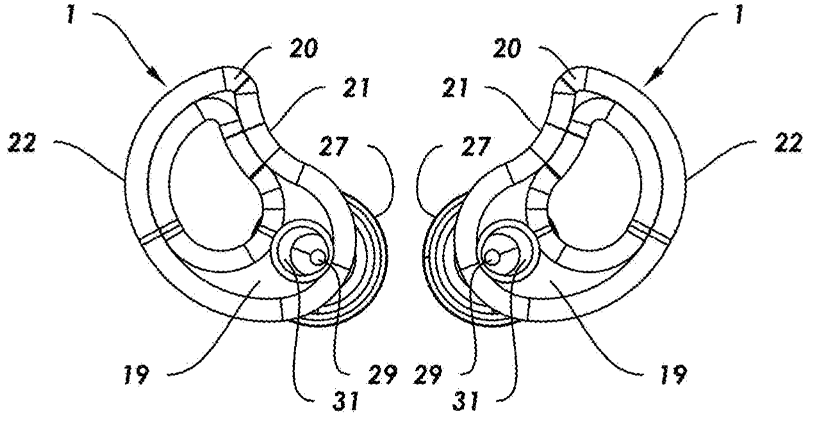
FIG. 6C is a rear view of the particular embodiment of the earpieces shown in FIG. 6A.
Figure 6D:
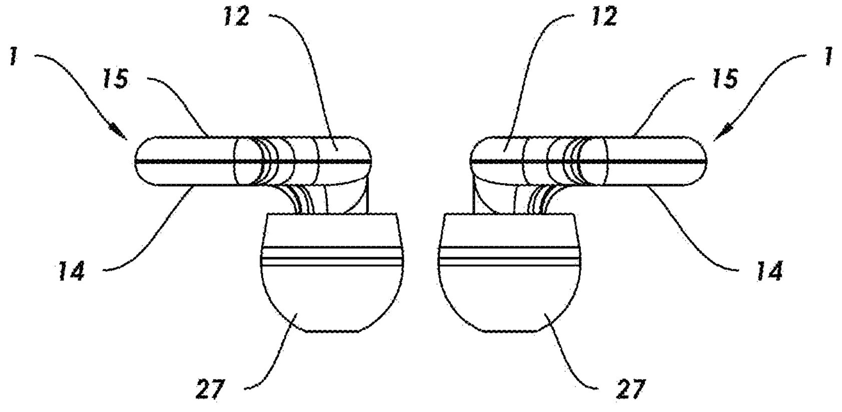
FIG. 6D is a top view of the particular embodiment of the earpieces shown in FIG. 6A.
Figure 6E:
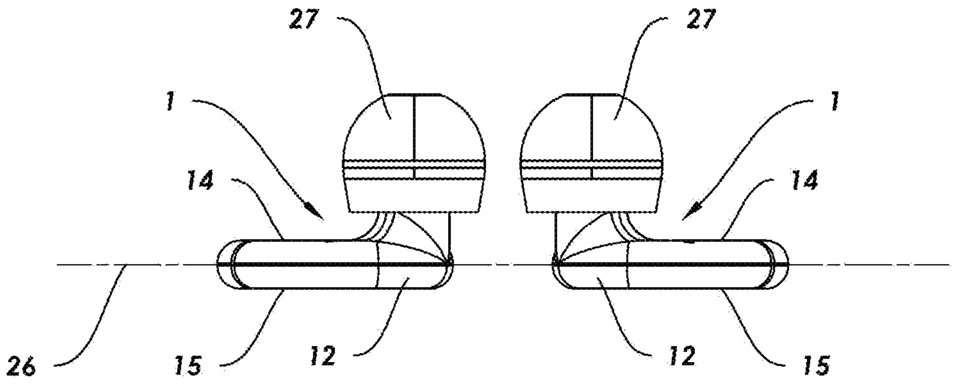
FIG. 6E is a bottom view of the particular embodiment of the earpieces shown in FIG. 6A.
Figure 6F:
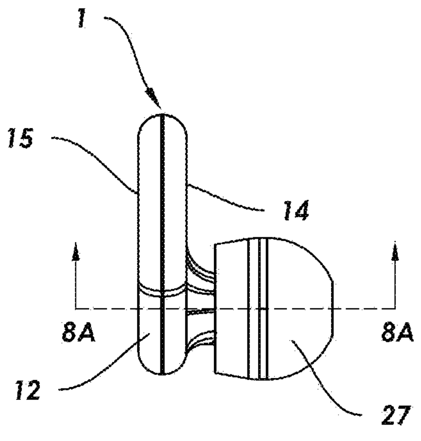
FIG. 6F is a left view of the particular embodiment of the earpieces shown in FIG. 6A.
Figure 6G:
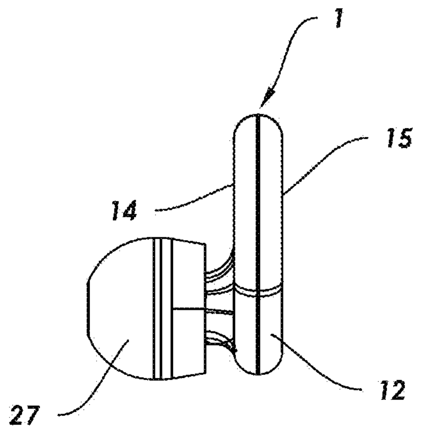
FIG. 6G is a right view of the particular embodiment of the earpieces shown in FIG. 6A.
Figure 7A:
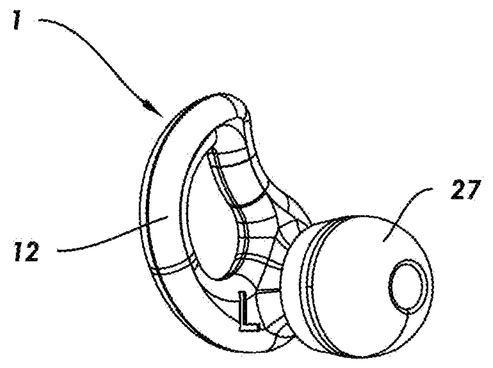
FIG. 7A is a perspective view of a particular embodiment of a left inventive universal earpiece.
Figure 7B:
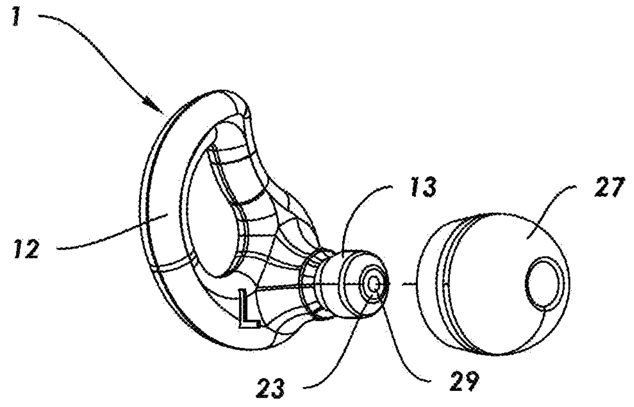
FIG. 7B is an exploded view of the earpiece shown in FIG. 7A.
Figure 7C:
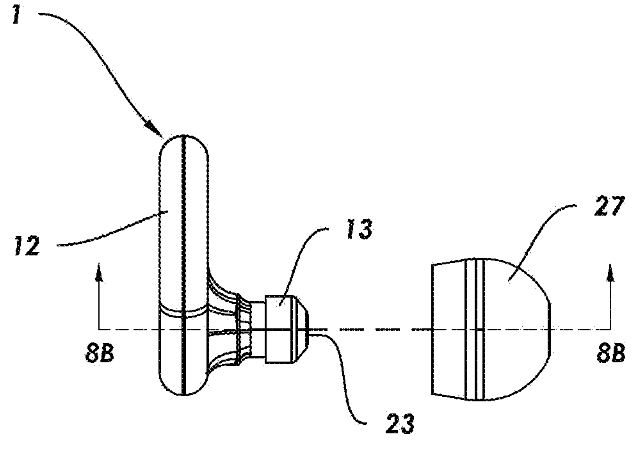
FIG. 7C is an exploded left view of the earpiece shown in FIG. 7A.
Figure 7D:
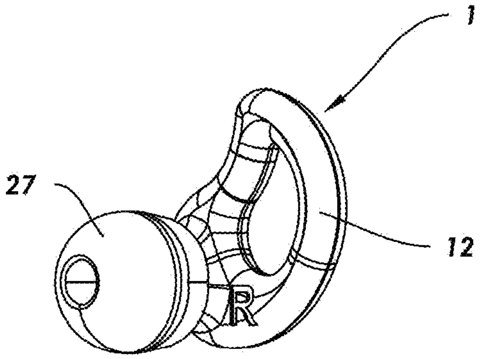
FIG. 7D is a perspective view of a particular embodiment of a right inventive universal earpiece.
Figure 7E:
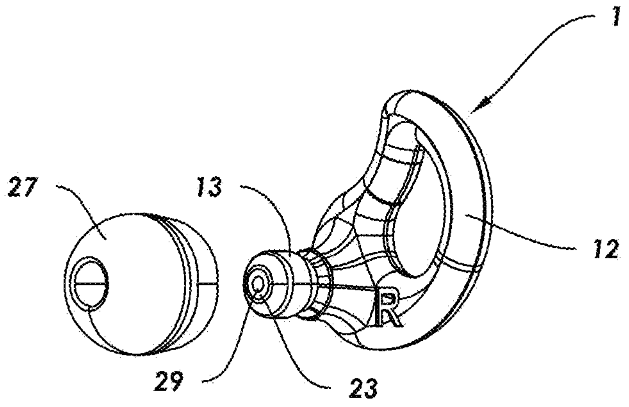
FIG. 7E is an exploded view of the earpiece shown in FIG. 7D.
Figure 7F:
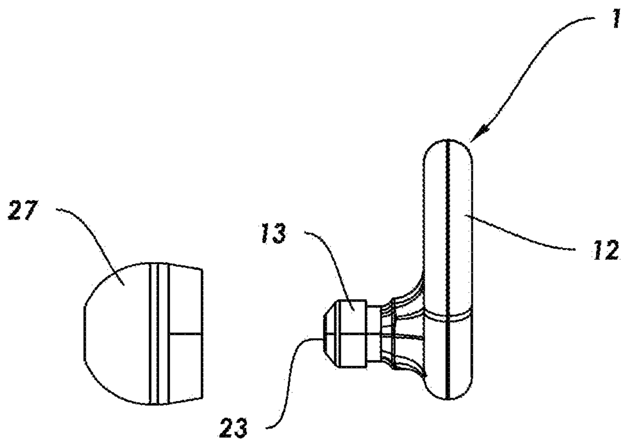
FIG. 7F is an exploded right view of the earpiece shown in FIG. 7D.
Figure 8A:
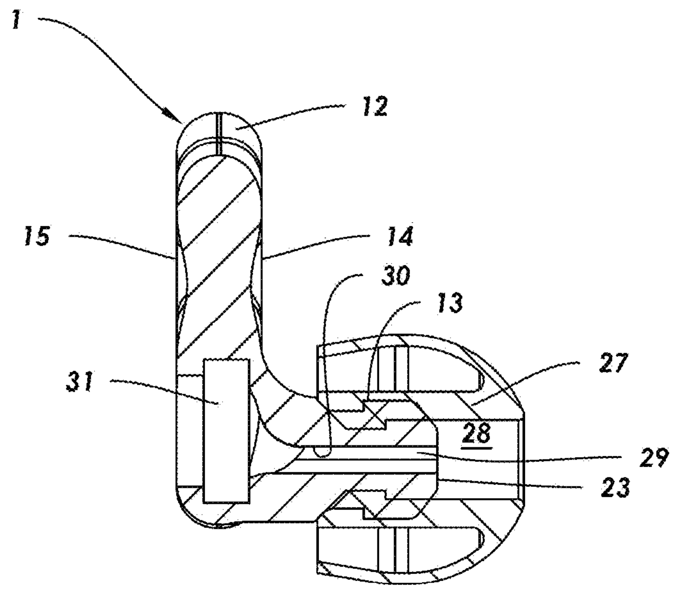
FIG. 8A is a cross-sectional view of the particular embodiment of the inventive universal earpiece shown in FIG. 6F.
Figure 8B:
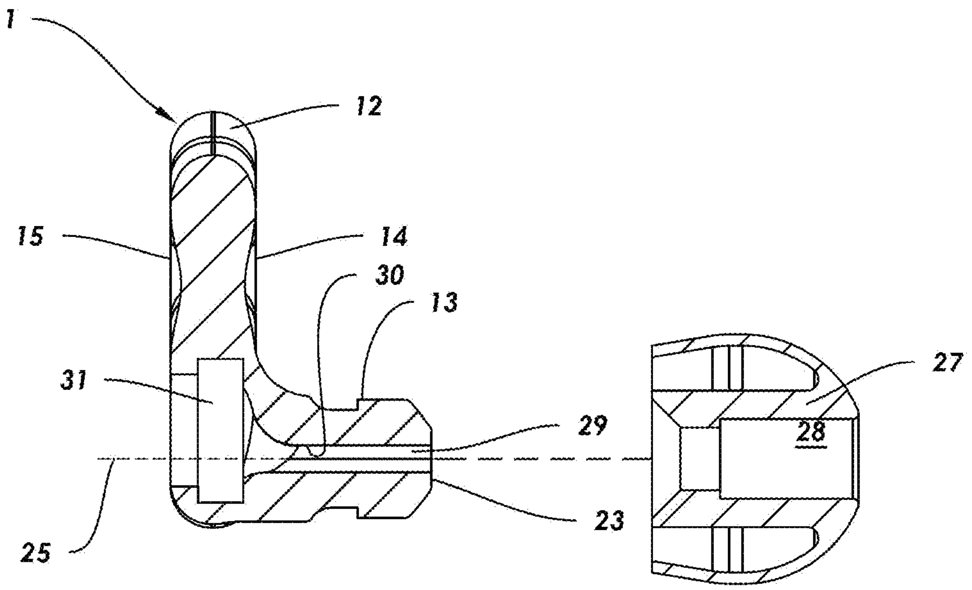
FIG. 8B is a cross-sectional view of the particular embodiment of the inventive universal earpiece shown in FIG. 7C.
Figure 9A:
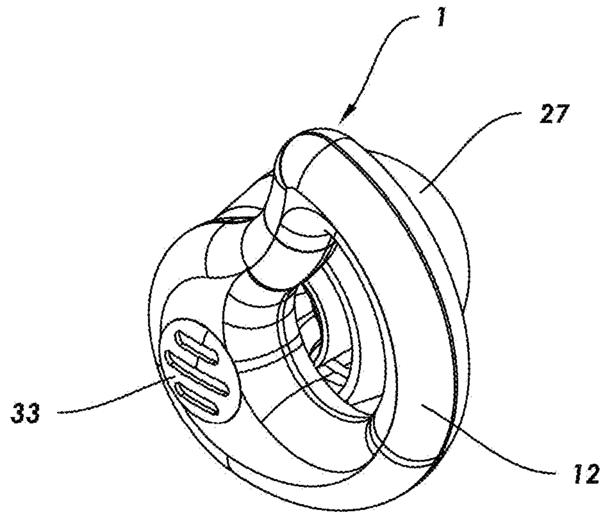
FIG. 9A is a perspective view of a particular embodiment of a left inventive universal earpiece with a filter disposed therein.
Figure 9B:
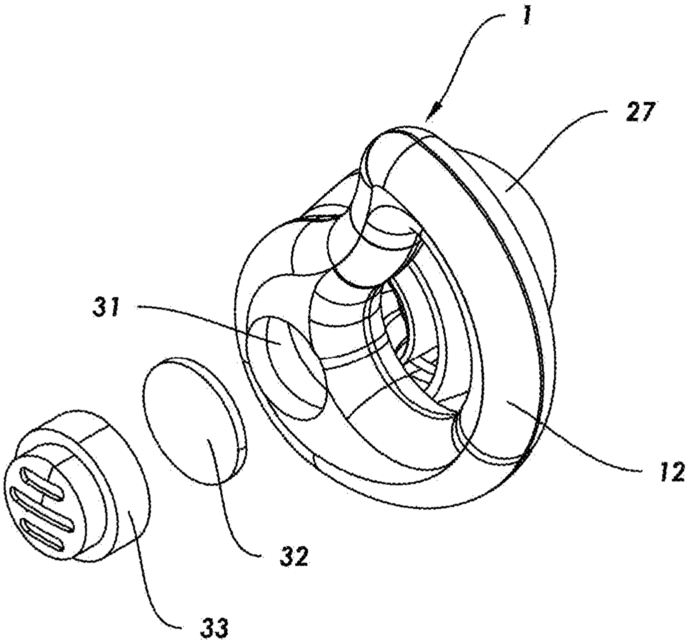
FIG. 9B is an exploded view of the earpiece shown in FIG. 9A.
Figure 9C:
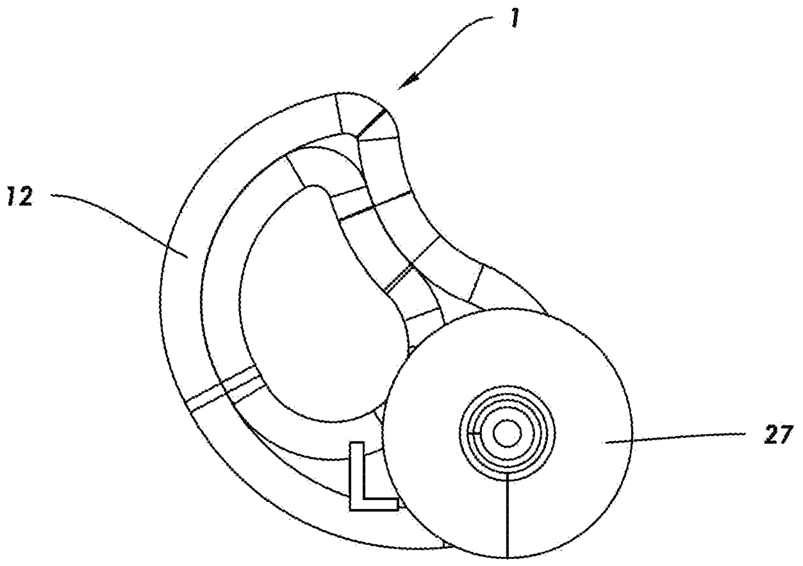
FIG. 9C is a front view of the earpiece shown in FIG. 9A.
Figure 9D:
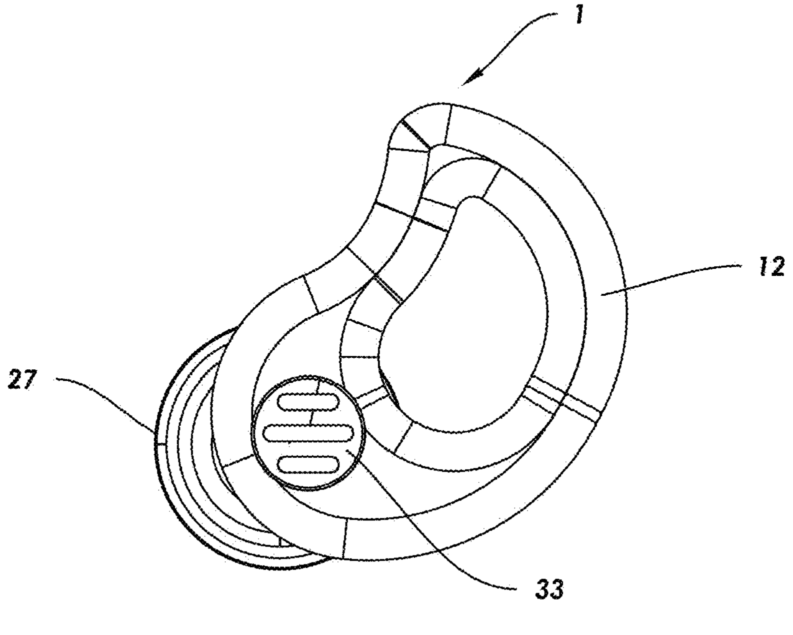
FIG. 9D is a rear view of the earpiece shown in FIG. 9A.
Figure 10A:
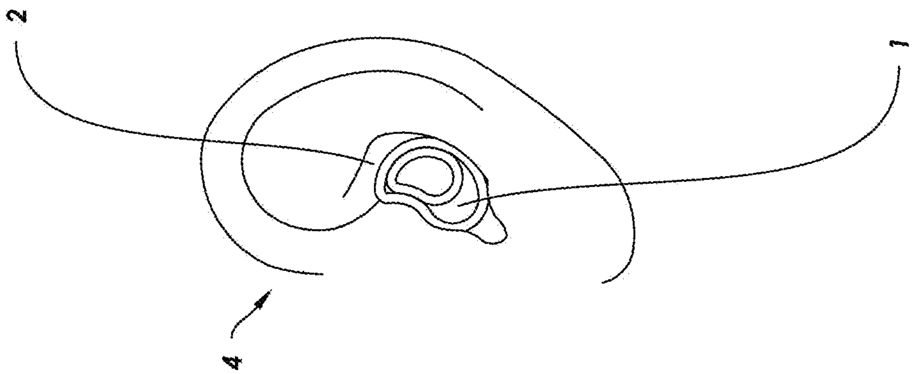
FIG. 10A is an illustration of a first rotational position of a particular embodiment of the universal earpiece which may provide an optimal fit within the concha.
Figure 10B:
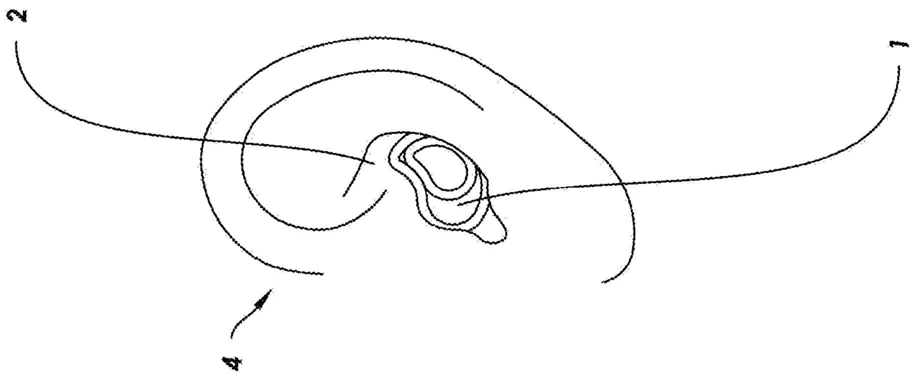
FIG. 10B is an illustration of a second rotational position of a particular embodiment of the universal earpiece which may provide an optimal fit within the concha.
Figure 10C:
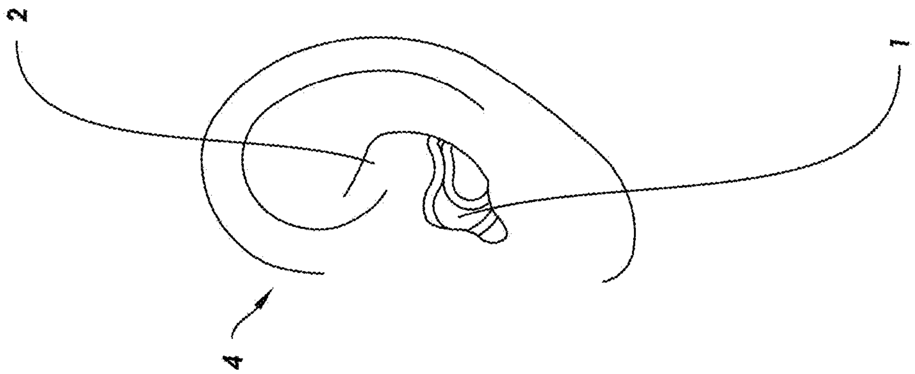
FIG. 10C is an illustration of a third rotational position of a particular embodiment of the universal earpiece which may provide an optimal fit within the concha.

As shown in FIGS. 5B and 8B, the projection element (13) can have a projection element longitudinal axis (25) extending therethrough. As to particular embodiments, the projection element (13) can outwardly extend from the retaining body inner surface (14) to dispose the projection element longitudinal axis (25) in angled relation to the retaining body inner surface (14). As to particular embodiments, the projection element (13) can outwardly extend from the retaining body inner surface (14) to dispose the projection element longitudinal axis (25) at an angle in a range of between about 60° and about 120° relative to the retaining body inner surface (14). As to particular embodiments, the projection element (13) can outwardly extend from the retaining body inner surface (14) to dispose the projection element longitudinal axis (25) at an angle in a range of between about 70° and about 110° relative to the retaining body inner surface (14). As to particular embodiments, the projection element (13) can outwardly extend from the retaining body inner surface (14) to dispose the projection element longitudinal axis (25) at an angle in a range of between about 80° and about 100° relative to the retaining body inner surface (14). As to particular embodiments, the projection element (13) can outwardly extend from the retaining body inner surface (14) to dispose the projection element longitudinal axis (25) at an angle in a range of between about 85° and about 95° relative to the retaining body inner surface (14). As to particular embodiments, the projection element (13) can outwardly extend from the retaining body inner surface (14) to dispose the projection element longitudinal axis (25) at an angle of about 90° relative to the retaining body inner surface (14). Said another way, the projection element (13) can outwardly extend from the retaining body inner surface (14) to dispose the projection element longitudinal axis (25) in substantially orthogonal relation to the retaining body inner surface (14).

As shown in FIGS. 4B, 4E, 7B, and 7E, the retaining body (12) can have a retaining body central (26) extending therethrough between the retaining body inner and outer surfaces (14)(15). As to particular embodiments, the projection element (13) can outwardly extend from the retaining body inner surface (14) to dispose the projection element longitudinal axis (25) in angled relation to the retaining body central plane (26). As to particular embodiments, the projection element (13) can outwardly extend from the retaining body inner surface (14) to dispose the projection element longitudinal axis (25) at an angle in a range of between about 60° and about 120° relative to the retaining body central plane (26). As to particular embodiments, the projection element (13) can outwardly extend from the retaining body inner surface (14) to dispose the projection element longitudinal axis (25) at an angle in a range of between about 70° and about 110° relative to the retaining body central plane (26). As to particular embodiments, the projection element (13) can outwardly extend from the retaining body inner surface (14) to dispose the projection element longitudinal axis (25) at an angle in a range of between about 80° and about 100° relative to the retaining body central plane (26). As to particular embodiments, the projection element (13) can outwardly extend from the retaining body inner surface (14) to dispose the projection element longitudinal axis (25) at an angle in a range of between about 85° and about 95° relative to the retaining body central plane (26). As to particular embodiments, the projection element (13) can outwardly extend from the retaining body inner surface (14) to dispose the projection element longitudinal axis (25) at an angle of about 90° relative to the retaining body central plane (26). Said another way, the projection element (13) can outwardly extend from the retaining body inner surface (14) to dispose the projection element longitudinal axis (25) in substantially orthogonal relation to the retaining body central plane (26).

The projection element (13) can be fabricated, formed, or molded from a wide variety of elastic or rigid thermoplastics having a prerequisite hardness (or softness) including, but not necessarily limited to, silicone, acrylic, nylon, acrylonitrile butadiene styrene, polylactic acid, polybenzimidzole, polycarbonate, polyether sulfone, polyethylene, urethane, other like materials, or combinations thereof. As to particular embodiments, the projection element (13) can comprise the same material(s) as the retaining body (12).

Now referring primarily to FIGS. 3A through 8B, the present universal earpiece (1) can, but need not necessarily, further include an elastic tip (or grommet) (27) configured to dispose about the projection element (13), whereby the tip (27) can conform to and sealably engage with the ear canal opening (3) concurrent with disposition of the retaining body (12) within the concha (2) when the earpiece is worn by a wearer. The tip (27) can comprise any one or a combination of pliant materials which can elastically deform upon engagement with the ear canal opening (3)/ear canal and return toward its original configuration upon disengagement with the ear canal opening (3)/ear canal, such as silicone, foam, foam rubber, hydrogel, or the like. As to particular embodiments, the tip (27) can include a continuously smooth external surface.

The tip (27) can be integrated with the projection element (13) as a one-piece construct (not shown), or the tip (27) can be configured to removably or detachably couple to the projection element (13) such that the tip (27) can be exchangeable. Regarding the latter configuration, for coupling, the tip (27) can include a tip passage (28) axially disposed therein and configured to insertingly receive the projection element (13) to dispose the tip (27) about the projection element (13). As to particular embodiments, multiple tips (27) can be compatible with the projection element (13), whereby the tips (27) may vary in size (and/or stiffness), allowing the wearer of the earpiece (1) to select the most appropriate variant in order to achieve optimal sealing engagement with the ear canal opening (3).

Now referring primarily to FIGS. 3A through 8B, as to particular embodiments, the present universal earpiece (1) can function as a passive earplug useful for occluding the ear canal opening (3) to block, whether partially or completely, external sound or noise. In this context, the passive earplug may not include acoustic features, e.g., it does not provide sound to the ear (4).

Now referring primarily to FIGS. 3A through 5B, a particular embodiment of the earpiece (1) which functions as a passive earplug is shown. In this embodiment, both the retaining body (12) and the projection element (13) can be substantially solid, and can function to occlude the ear canal opening (3) and block, whether partially or completely, external sound or noise.

Now referring primarily to FIGS. 6A through 8B, a particular embodiment of the earpiece (1) which functions as a passive earplug is shown. In this embodiment, an earpiece passage (29) defined by an earpiece internal surface (30) can axially dispose through the earpiece (1) to communicate between the retaining body outer surface (15) and the projection element end (23), whereby sound can travel through the earpiece passage (29). The earpiece internal surface (30) can further define a filter receptacle (31) in communication with the earpiece passage (29), whereby the filter receptacle (31) can be configured to insertingly receive and retain or releasably retain a filter (32), such as a percussive filter which can attenuate or actively reduce sound waves to safe levels while allowing for full situational awareness. As to particular embodiments, the filter receptacle (31) can be disposed proximate the retaining body outer surface (15). As to particular embodiments, the filter (32) can be secured within the filter receptacle (31) via a securing member (33) which can couple to the earpiece (1) to close the filter receptacle (31).

As to particular embodiments, the earpiece (1) can consist of the retaining body (12) and the projection element (13).

As to particular embodiments, the earpiece (1) can consist of the retaining body (12), the projection element (13), and the tip (27).

As to particular embodiments, the earpiece (1) can consist of the retaining body (12), the projection element (13), and the filter (32).

As to particular embodiments, the earpiece (1) can consist of the retaining body (12), the projection element (13), the tip (27), and the filter (32).

While some embodiments of the earpiece (1) can function as a passive earplug, other embodiments of the earpiece (1) can be configured for use with one or more of a wide variety of in-ear devices, such as earbuds, earphones, ear speakers, sealing balloons, ear tips, ear tubes, in-ear hearing aids, or the like. As but one illustrative example, the earpiece (1) can be configured for use with an audio generating device, for example, using a connecting cable or via electronics modules which can wirelessly communicate with corresponding audio generating devices. For example, an earpiece (1) may be connected to an audio generating device wirelessly via a BLUETOOTH® transceiver disposed within the earpiece (1).

Now referring primarily to FIGS. 1A through 1C and 10A through 10C, a method of using the present universal earpiece (1) can include obtaining the earpiece (1), inserting the earpiece (1) into the external ear (4) of a wearer by (i) disposing the retaining body (12) within the concha (2) and (ii) disposing the projection element (13) within the ear canal opening (3), and rotating the earpiece (1) to fixedly engage the retaining body (12) with the concha (2) to retain the projection element (13) within the ear canal opening (3).

Again referring primarily to FIGS. 1A through 1C and 10A through 10C, as to particular embodiments, the earpiece (1) can be rotated (whether clockwise or counter-clockwise) to dispose the retaining body (12) in contact with, behind, beneath, or underneath one or more of the antihelix (6), antitragus (11), or tragus (10) to effectively wedge the retaining body (12) and correspondingly the earpiece (1) within the concha (2) which, in turn, retains the projection element (13) within the ear canal opening (3).

Rotating the earpiece (1) for fitment enables the earpiece (1) (*i*) to be easily optimally positioned within the concha (2) without excessively forcing the protrusion element (13) deep into the ear canal, and (ii) to be comfortably anchored in place which, of course, increases stability and prevents the earpiece (1) from falling out.

As to particular embodiments, the method can, but need not necessarily, further include disposing a tip (27) about the projection element (13) prior to insertion of the earpiece (1) into the external ear (4).

As to particular embodiments, the method can, but need not necessarily, further include coupling a filter (32) to the earpiece (1).

A method of making the present universal earpiece (1) can include providing a retaining body (12) and outwardly extending a projection element (13) therefrom. The earpiece (1) and components thereof can be produced from any of a wide variety of processes depending upon the application, such as injection molding, press molding, fabrication, machining, printing, additive printing, or the like, or combinations thereof, as one piece or assembled from a plurality of pieces into an earpiece (1). As stated above, as to particular embodiments, the projection element (13) can be integrally formed with the retaining body (12) such that the projection element (13) and the retaining body (12) can be formed as a one-piece construct, a monolithic construct, or a unified whole.

As can be easily understood from the foregoing, the basic concepts of the present invention may be embodied in a variety of ways. The invention involves numerous and varied embodiments of an earpiece and methods for making and using such an earpiece.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a retainer" should be understood to encompass disclosure of the act of "retaining"—whether explicitly discussed or not—and, conversely, were there effectively disclosure of the act of "retaining", such a disclosure should be understood to encompass disclosure of "retaining" and even a "means for retaining." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

Moreover, for the purposes of the present invention, the term "a" or "an" entity refers to one or more of that entity; for example, "a protrusion" refers to one or more of those protrusions. As such, the terms "a" or "an", "one or more" and "at least one" can be used interchangeably herein.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment.

As used herein with respect to an identified property or circumstance, "substantially" refers to a degree of deviation that is sufficiently small so as to not measurably detract from the identified property or circumstance. The exact degree of deviation allowable may in some cases depend on the specific context.

Thus, the applicant(s) should be understood to claim at least: i) each of the earpieces herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice versa as necessary to define the matter for which protection is sought by this application or by any subsequent application or continuation, division, or continuation in part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation in part application thereof or any reissue or extension thereon.

The claims set forth in this specification are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. An earpiece comprising:

a retaining body; and a projection element outwardly extending from a substantially planar retaining body inner surface which extends between opposing ends of said retaining body;

wherein when a wearer wears said earpiece:

said retaining body configured to dispose within the concha of an ear of a wearer; and said projection element configured for projecting into the ear canal opening of said wearer;

wherein upon rotation of said earpiece, said retaining body fixedly engages with said concha to retain said projection element within said ear canal opening.

2. The earpiece of claim 1, wherein:

said retaining body comprising said retaining body inner surface opposite a retaining body outer surface;

said retaining body inner and outer surfaces extend between a retaining body external edge and a retaining body internal edge; and said retaining body configured as an annular member.

3. The earpiece of claim 2, said retaining body configured as a continuous annular member.

4. The earpiece of claim 2, said retaining body inner and outer surfaces substantially planar.

5. The earpiece of claim 2, said retaining body comprising a proximal portion coupled to an outer arcuate portion coupled to a distal portion coupled to an inner arcuate portion which couples to said proximal portion.

6. The earpiece of claim 5, wherein said proximal portion disposes proximate said ear canal opening and said distal portion disposes distal from said ear canal opening when said earpiece is worn by said wearer.

7. The earpiece of claim 5, wherein said outer arcuate portion disposes proximate the antihelix when said earpiece is worn by said wearer.

8. The earpiece of claim 5, said proximal portion convexly arcuate and comprising a proximal portion radius of curvature.

9. The earpiece of claim 8, said distal portion convexly arcuate and comprising a distal portion radius of curvature.

10. The earpiece of claim 9, said proximal portion radius of curvature greater than said distal portion radius of curvature.

11. The earpiece of claim 5, said inner arcuate portion concavely arcuate.

12. The earpiece of claim 2, wherein said retaining body internal edge defines an aperture element communicating between said retaining body inner and outer surfaces.

13. The earpiece of claim 2, wherein said retaining body internal edge defines only one aperture element communicating between said retaining body inner and outer surfaces.

14. The earpiece of claim 5, wherein said projection element outwardly extends from said retaining body inner surface proximate said proximal portion.

15. The earpiece of claim 14, wherein said projection element outwardly extends from a location on said retaining body inner surface proximate said proximal portion which aligns said projection element with said ear canal opening for disposition therein concurrent with disposition of said retaining body within said concha when said earpiece is worn by said wearer.

16. The earpiece of claim 14, said projection element coupled to said retaining body inner surface.

17. The earpiece of claim 14, said projection element integrally formed with said retaining body inner surface.

18. The earpiece of claim 17, said projection element and said retaining body formed as a one-piece construct.

19. The earpiece of claim 14, wherein said projection element outwardly extends from said retaining body inner surface to dispose a projection element longitudinal axis at an angle of between about 60° and about 120° relative to said retaining body inner surface.

20. The earpiece of claim 1, further comprising a tip configured for disposition about said projection element.

* * * * *